United States Patent
Haruta et al.

(10) Patent No.: US 8,692,899 B2
(45) Date of Patent: Apr. 8, 2014

(54) IMAGING APPARATUS WITH AN INPUT/OUTPUT UNIT AND A LENS MOVING MECHANISM

(75) Inventors: Tsutomu Haruta, Kanagawa (JP); Eiji Makino, Kanagawa (JP); Takeshi Yamaguchi, Fukuoka (JP); Shinsuke Shimomoto, Fukuoka (JP)

(73) Assignee: Sony Corporation, Tokyo (JP)

( * ) Notice: Subject to any disclaimer, the term of this patent is extended or adjusted under 35 U.S.C. 154(b) by 324 days.

(21) Appl. No.: 12/591,334

(22) Filed: Nov. 17, 2009

(65) Prior Publication Data

US 2010/0141796 A1 Jun. 10, 2010

(30) Foreign Application Priority Data

Dec. 8, 2008 (JP) ................................ 2008-312667

(51) Int. Cl.
*H04N 5/228* (2006.01)
*H04N 5/232* (2006.01)
*H04N 5/225* (2006.01)

(52) U.S. Cl.
USPC ........................ 348/222.1; 348/345; 348/374

(58) Field of Classification Search
None
See application file for complete search history.

(56) References Cited

U.S. PATENT DOCUMENTS

| 6,498,621 B1 * | 12/2002 | Ikeda et al. | 348/222.1 |
| 2003/0063212 A1 * | 4/2003 | Watanabe et al. | 348/349 |
| 2005/0237420 A1 * | 10/2005 | Kokubun | 348/340 |

FOREIGN PATENT DOCUMENTS

| JP | 2004-048446 A | 2/2004 |
| JP | 2004-289870 | 10/2004 |
| JP | 2007-143118 A | 6/2007 |

OTHER PUBLICATIONS

Japanese Office Action issued Sep. 14, 2010 for corresponding Japanese Application No. 2008-312667.

* cited by examiner

*Primary Examiner* — Justin P Misleh
(74) *Attorney, Agent, or Firm* — Rader, Fishman & Grauer PLLC

(57) ABSTRACT

A solid-state imaging device includes: an imaging unit taking a subject image focused by an imaging optical system; a digital signal processing unit generating image data of the subject image taken by the imaging unit and luminance data thereof; an input/output unit inputting and outputting data; a focus evaluation value generating unit generating a focus evaluation value of the subject image based on the luminance data outputted from the digital signal processing unit and outputting the focus evaluation value from the input/output unit; and an imaging drive unit starting an imaging operation by the imaging unit when an imaging instruction signal is inputted from the input/output unit, and outputting an imaging-end timing signal from the input/output unit when the imaging operation is completed.

11 Claims, 9 Drawing Sheets

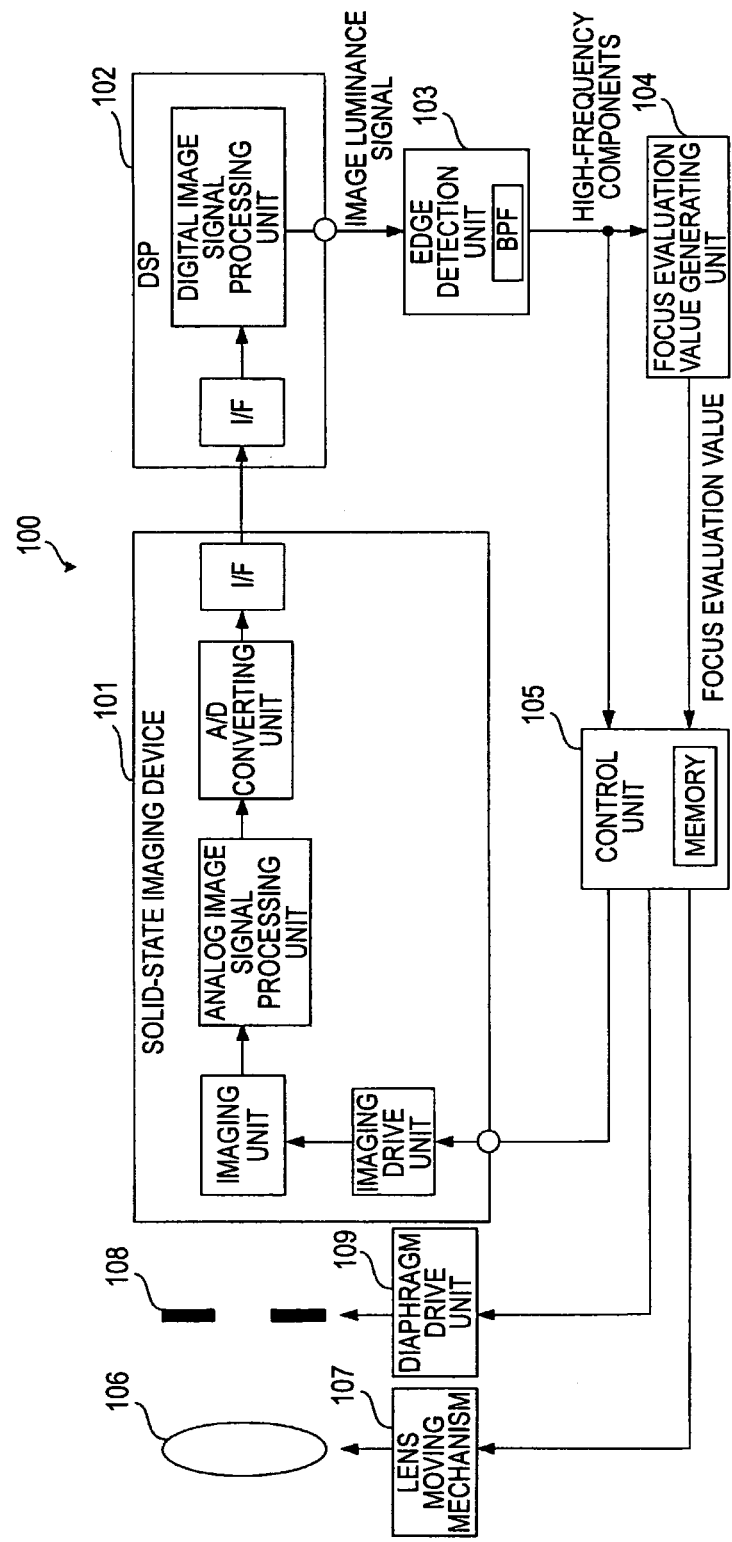

IMAGING APPARATUS WITH AN INPUT/OUTPUT UNIT AND A LENS MOVING MECHANISM

BACKGROUND OF THE INVENTION

1. Field of the Invention

The present invention relates to an imaging apparatus and a solid-state imaging device thereof, and particularly relates to an imaging apparatus and a solid-state imaging device thereof capable of performing focus control.

2. Description of the Related Art

In recent years, imaging apparatuses capable of taking and storing images by using a solid-state imaging device such as a digital still camera and a digital video camera are widely used. As an imaging device used for such imaging apparatuses, a CCD image sensor has been most commonly used, however, a CMOS image sensor is receiving attention as the number of pixels of the imaging device is further increased. The CMOS image sensor has advantages that the sensor can randomly access pixel signals and perform readout at high speed, furthermore, it is highly sensitive and has low power consumption as compared with the CCD image sensor.

Incidentally, in this type of imaging apparatus, an autofocus (AF) function which automatically focuses on a subject is commonly mounted (for example, refer to JP-A-2004-289870. Imaging conditions of focus are adjusted based on image signals outputted from the solid-state imaging device. For example, high luminance components of image signals are integrated to calculate a focus evaluation value, and the position of a focus adjustment lens is adjusted so that the focus evaluation value becomes maximum.

FIG. 11 shows a configuration of an imaging apparatus of related art. The imaging apparatus 100 in related art includes a solid-state imaging device 101, a DSP 102, an edge detection unit 103, a focus evaluation value generating unit 104, a control unit 105, a focus adjustment lens 106, a lens moving mechanism 107, a diaphragm 108, a diaphragm drive unit 109 and so on.

When performing autofocus control, the control unit 105 allows the solid-state imaging device 101 to output image signals, inputting the image signals to the DSP 102 through an interface (I/F). The DSP 102 generates image luminance signals from the image signals and outputs the signals to the edge detection unit 103. The edge detection unit 103 extracts high-frequency components of the image luminance signals (hereinafter, refer to "high luminance components" in the following description) and detects an edge portion of a taken image from the high luminance components to output to the control unit 105. The control unit 105 confines a focus area to the periphery of the edge portion based on the information acquired from the edge detection unit 103.

The control unit 105 controls the solid-state imaging device 101 to output image signals in the focus area from the solid-state imaging device 101 as well as outputs high luminance components to the focus evaluation value generating unit 104 through the I/F, the DSP 102 and the edge detection unit 103. The focus evaluation value generating unit 104 outputs a value obtained by integrating the high frequency components to the control unit 105 as a focus evaluation value. The control unit 105 controls the lens moving mechanism 107 to move the focus adjustment lens 106 and performs the same processing to determine the position of the focus adjustment lens 106 at which the focus evaluation value becomes maximum as a focused position, then, the control unit 105 arranges the focus adjustment lens 106 at the focused position.

SUMMARY OF THE INVENTION

However, in the above imaging apparatus of related art, the autofocus control mechanism is decentralized, and plural semiconductor chips, modules and interfaces (I/F) to be provided between them are necessary, which may cause increase of wiring in the imaging apparatus and complication of the configuration.

Thus, it is desirable to provide an imaging apparatus and a solid-state imaging device thereof capable of suppressing the increase of internal wiring and complication of the configuration when the autofocus control function is provided.

According to an embodiment of the invention, there is provided an imaging apparatus including a focus adjustment lens, a lens moving mechanism moving the focus adjustment lens in an optical axis direction, an operation unit which can be operated by a user, a solid-state imaging device which has an imaging unit taking a subject image focused by an imaging optical system, a digital signal processing unit generating image data of the subject image taken by the imaging unit and luminance data thereof, an input/output unit inputting and outputting data, a focus evaluation value generating unit generating a focus evaluation value of the subject image based on the luminance data outputted from the digital signal processing unit and outputting the focus evaluation value from the input/output unit, and an imaging drive unit starting an imaging operation by the imaging unit when an imaging instruction signal is inputted from the input/output unit, and outputting an imaging-end timing signal from the input/output unit when the imaging operation is completed, and a control unit controlling the lens moving mechanism and the solid-state imaging device in accordance with the operation to the operation unit by the user, in which the control unit outputs the imaging instruction signal to the input/output unit of the solid-state imaging device when detecting an autofocus instruction operation to the operation unit, controls the lens moving mechanism to move the focus adjustment lens when the imaging-end timing signal is inputted from the input/output unit of the solid-state imaging device, and determines a focused position of the focus adjustment lens based on the focus evaluation value outputted from the input/output unit of the solid-state imaging device.

In the imaging apparatus according to the embodiment of the invention, the control unit outputs the imaging instruction signal to the input/output unit of the solid-state imaging device when detecting the autofocus instruction operation to the operation unit, and when the imaging-end timing signal is inputted from the input/output unit of the solid-state imaging device, repeats the processings of controlling the lens moving mechanism to move the focus adjustment lens as well as acquiring the focus evaluation value outputted from the input/output unit of the solid-state imaging device until the focus evaluation value outputted from the input/output unit of the solid-state imaging device reaches the peak.

In the imaging apparatus according to the embodiment of the invention, in the case that the focus evaluation value acquired from the solid-state imaging device satisfies a given condition, the control unit acquires the focus evaluation value from the solid-state imaging device without moving the focus adjustment lens when the imaging-end timing signal is inputted from the input/output unit of the solid-state imaging device and moves the focus adjustment lens by a movement amount corresponding to the acquired focus evaluation value.

In the imaging apparatus according to the embodiment of the invention, the control unit stops movement of the focus adjustment lens in accordance with the focus evaluation value when the focus evaluation value is acquired from the solid-state imaging device in a process of moving the focus adjustment lens.

In the imaging apparatus according to the embodiment of the invention, the control unit outputs the imaging instruction signal to the input/output unit of the solid-state imaging device when detecting the autofocus instruction operation to the operation unit, performs the processing of controlling the lens moving mechanism to move the focus adjustment lens by a predetermined amount as well as acquiring the focus evaluation value outputted from the input/output unit of the solid-state imaging device, in a movement range of the focus adjustment lens when the imaging-end timing signal is inputted from the input/output unit of the solid-state imaging device, and determines a position at which the focus evaluation value outputted from the solid-state imaging device becomes maximum in respective moved positions of the focus adjustment lens as the focused position of the focus adjustment lens.

According to another embodiment of the invention, there is provided a solid-state imaging device including an imaging unit taking a subject image focused by an imaging optical system, a digital signal processing unit generating image data of the subject image taken by the imaging unit and luminance data thereof, an input/output unit inputting and outputting data, a focus evaluation value generating unit generating a focus evaluation value of the subject image based on the luminance data outputted from the digital signal processing unit and outputting the focus evaluation value from the input/output unit, and an imaging drive unit starting an imaging operation by the imaging unit when an imaging instruction signal is inputted from the input/output unit, and outputting an imaging-end timing signal from the input/output unit when the imaging operation is completed.

According to the embodiments of the invention, it is possible to provide a compact and high-performance solid-state imaging device which realizes simplification of the configuration of an imaging apparatus and the imaging apparatus having the solid-state imaging device. That is, it is not necessary to provide an input/output interface between the solid-state imaging device and a digital signal processing unit which was necessary in the past, which realizes reduction of the apparatus scale and simplification of data transfer.

BRIEF DESCRIPTION OF THE DRAWINGS

FIG. 11 is a block diagram showing a configuration of an imaging apparatus of related art.

DESCRIPTION OF THE PREFERRED EMBODIMENTS

Hereinafter, preferred embodiments of the invention (hereinafter, refer to as "embodiments") will be explained. The explanation will be made in the following order.

1. First Embodiment (a first example of autofocus control)
2. Second Embodiment (a second example of autofocus control)
3. Other Embodiments

1. First Embodiment

[1-1. Configuration of an Imaging Apparatus]

Figure 1:
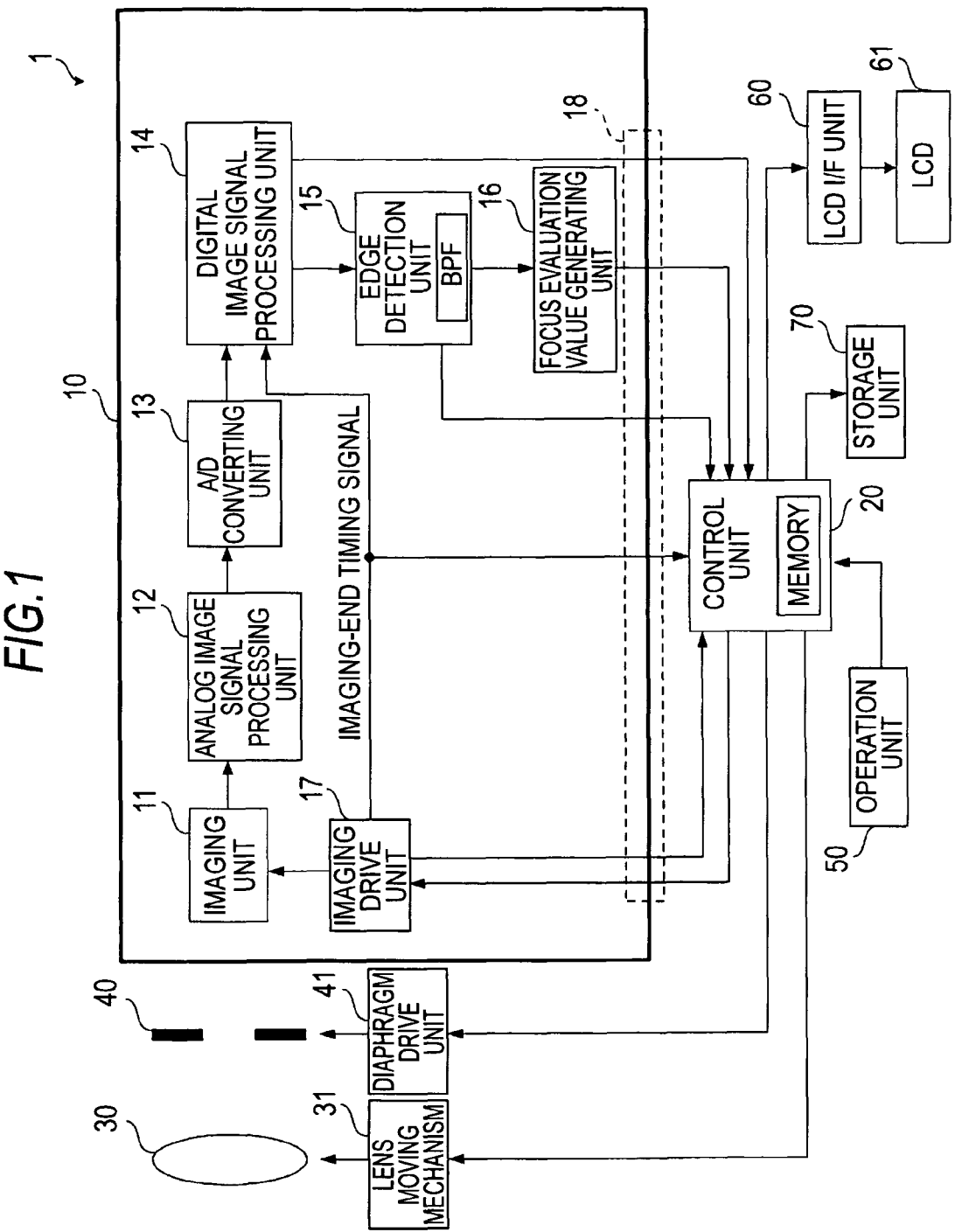
FIG. 1 is a block diagram showing a configuration of an imaging apparatus according to a first embodiment of the invention.

First, a configuration of an imaging apparatus according to the first embodiment will be explained with reference to the drawings. FIG. 1 is a block diagram showing a configuration of an imaging apparatus according to the first embodiment.

As shown in FIG. 1, the imaging apparatus 1 according to the embodiment includes a solid-state imaging device 10, a control unit 20, a focus adjustment lens 30, a lens moving mechanism 31, a diaphragm 40 and a diaphragm drive unit 41, an operation unit 50, an LCD-I/F unit 60, an LCD 61, a storage unit 70 and the like.

The imaging apparatus 1 takes a subject image in the solid-state imaging device 10, displays image data outputted from the solid-state imaging device 10 in the LCD 61 through the LCD-I/F unit 60 or stores the image data in the storage unit 70.

The imaging apparatus 1 further includes an autofocus function, and the control unit 20 controls the lens moving mechanism 31 to move the focus adjustment lens 30 to a focused position based on a focus evaluation value outputted from the solid-state imaging device 10.

In the solid-state imaging device 10 of the embodiment, a DSP function, an edge detection function and a focus evaluation value generation function and the like for executing the autofocus function are included in the device. Accordingly, it is possible to make the imaging apparatus 1 compact by suppressing increase of wiring in the imaging apparatus 1 and complication of the configuration.

As shown in FIG. 1, the solid-state imaging device includes an imaging unit 11, an analog image signal processing unit 12, an A/D converting unit 13, a digital image signal processing unit 14, an edge detection unit 15, a focus evaluation value generating unit 16, an imaging drive unit 17, and an input/output unit 18. The input/output unit 18 includes an interface, an input/output terminal and the like for performing input/output of signals between the solid-state imaging device 10 and the control unit 20.

The imaging unit 11 takes a subject image focused by a not-shown imaging optical system including the focus adjustment lens 30. That is, the imaging unit 11 converts signal potentials corresponding to the subject image photoelectrically converted by photoelectric converting elements arranged in a two-dimensional matrix into analog electric signals (hereinafter, refer to analog image signals), and outputs the signals sequentially. The imaging unit 11 is of a CMOS (Complementary Metal Oxide Semiconductor) type, however, it may be of a CCD (Charge Coupled Devices) type.

The analog image signal processing unit 12 performs OB (Optical Black) clamp processing, CDS (Correlated Double Sampling) processing and AGC (Auto Gain Control) processing with respect to the analog image signals from the imaging unit 11. The OB clamp processing is processing for clamping signals in an OB area (shielded photoelectric converting unit) of the imaging unit 11 to reproduce a black level. The CDS processing is processing based on a correlated double sampling method, which keeps S/N ratio in a good condition.

The A/D conversion unit 13 performs A/D (analog/digital) conversion to the analog image signals outputted from the analog image signal processing unit 12 to output digital image signals.

The digital image signal processing unit 14 generates and outputs digital image data of the subject image taken by the imaging unit 11 and luminance data thereof based on the digital image signals inputted from the A/D conversion unit 13. Specifically, the digital image signal processing unit 14 generates RAW data by first performing signal correction processing of defective pixels in the solid-state imaging device 10, shading processing which corrects reduction of peripheral light intensity of lens and the like. Next, the digital image signal processing unit 14 performs demosaic processing to the RAW data, then, performs signal demodulating processing for AF control, AE (Auto Exposure) control, white balance control and the like, signal correction processing typified by white balance adjustment and the like. In the processing, luminance data of the image data of the subject image taken in the imaging unit 11 is generated and outputted. Further, the image data after the signal correction is converted into a luminance signal (Y) and color-differential signals (R-Y, B-Y) of a given format such as 4:2:2, and then into given resolution. After that, the image data is compressed and encoded to generate encoded data of a JPEG system. It is also preferable that encoding is performed by still-picture compression systems other than JPEG or by moving-picture compression systems.

The edge detection unit 15 includes a band-pass filter (BPF), which filters luminance data outputted from the digital image signal processing unit 14 to extract high frequency components (hereinafter, referred to as "high luminance components") of the subject image taken by the imaging unit 11. After that, the edge extraction unit 15 determines an edge portion of the image by calculating high frequency components of the image taken by the solid-state imaging device 10 from the high luminance components, and outputs the portion to the control unit 20 through the input/output unit 18 as edge position information.

The focus evaluation value generating unit 16 integrates high luminance components generated by the edge detection unit 15 based on the luminance data outputted by the digital image signal processing unit 14 and outputs the value to the control unit 20 through the input/output unit 18 as a focus evaluation value.

The imaging drive unit 17 controls an imaging operation by the imaging unit 11 based on a control signal outputted from the control unit 20. The imaging device unit 17 outputs a drive signal to the imaging unit 11 to allow the imaging unit 11 to take a subject image and outputs the analog image signals corresponding to the subject image. When an imaging instruction signal is inputted from the control unit 20, the imaging drive unit 17 allows the imaging unit 11 to start the imaging operation, and then, outputs an imaging-end timing signal when the imaging operation ends.

[1.2 Focus Control Processing by the Imaging Apparatus 1]

An autofocus operation in the imaging apparatus 1 configured as the above will be specifically explained below.

In the imaging apparatus 1 of the embodiment includes the digital image signal processing unit 14, the edge detection unit 15, the focus evaluation value generating unit 16 and the like, which are necessary for performing an autofocus function, inside the solid-state imaging device 10. The control unit 20 of the imaging apparatus 1 can acquire the focus evaluation value and the imaging-end timing signal from the solid-state imaging device 10 by operating the imaging drive unit 17 of the solid-state imaging device 10 as described later, thereby reducing processing load of the control unit 20.

Figure 2:
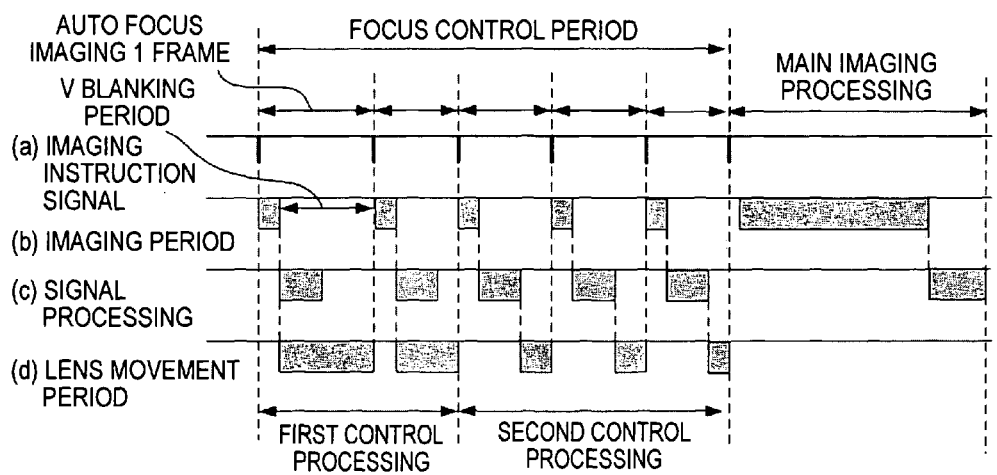
FIG. 2 is a view showing a timing chart of focus control processing of the imaging apparatus according to the first embodiment of the invention.
Figure 3:
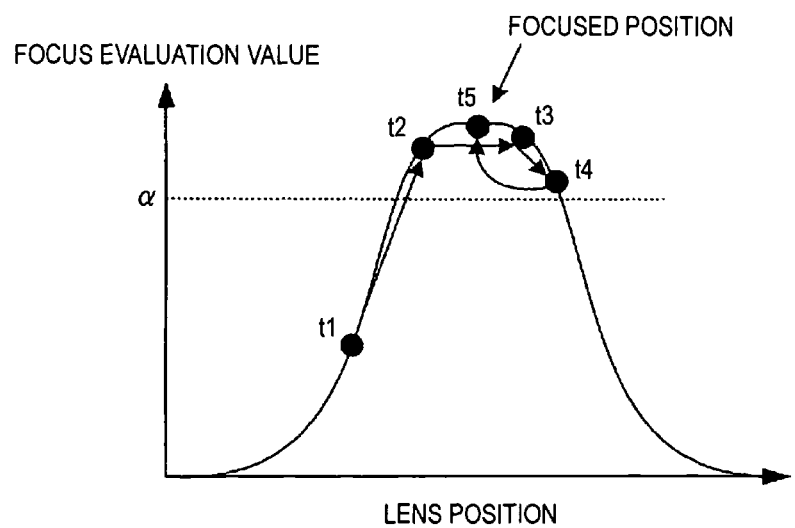
FIG. 3 is a graph for explaining determination of a peak value of a focus evaluation value according to the first embodiment of the invention.
Figure 4:
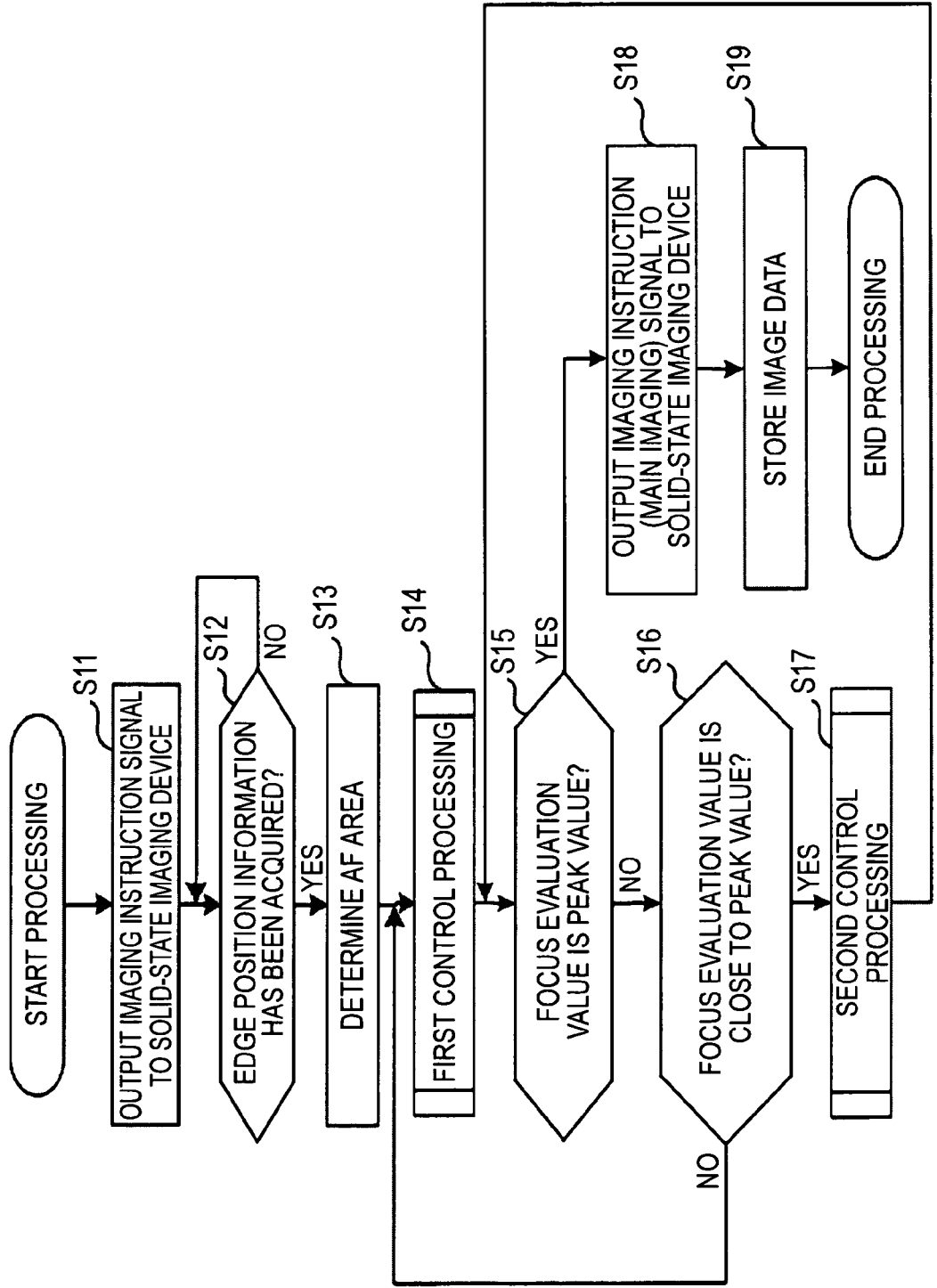
FIG. 4 is a chart showing the flow of imaging processing including the focus control processing performed by a control unit of the imaging apparatus according to the first embodiment of the invention.
Figure 5:
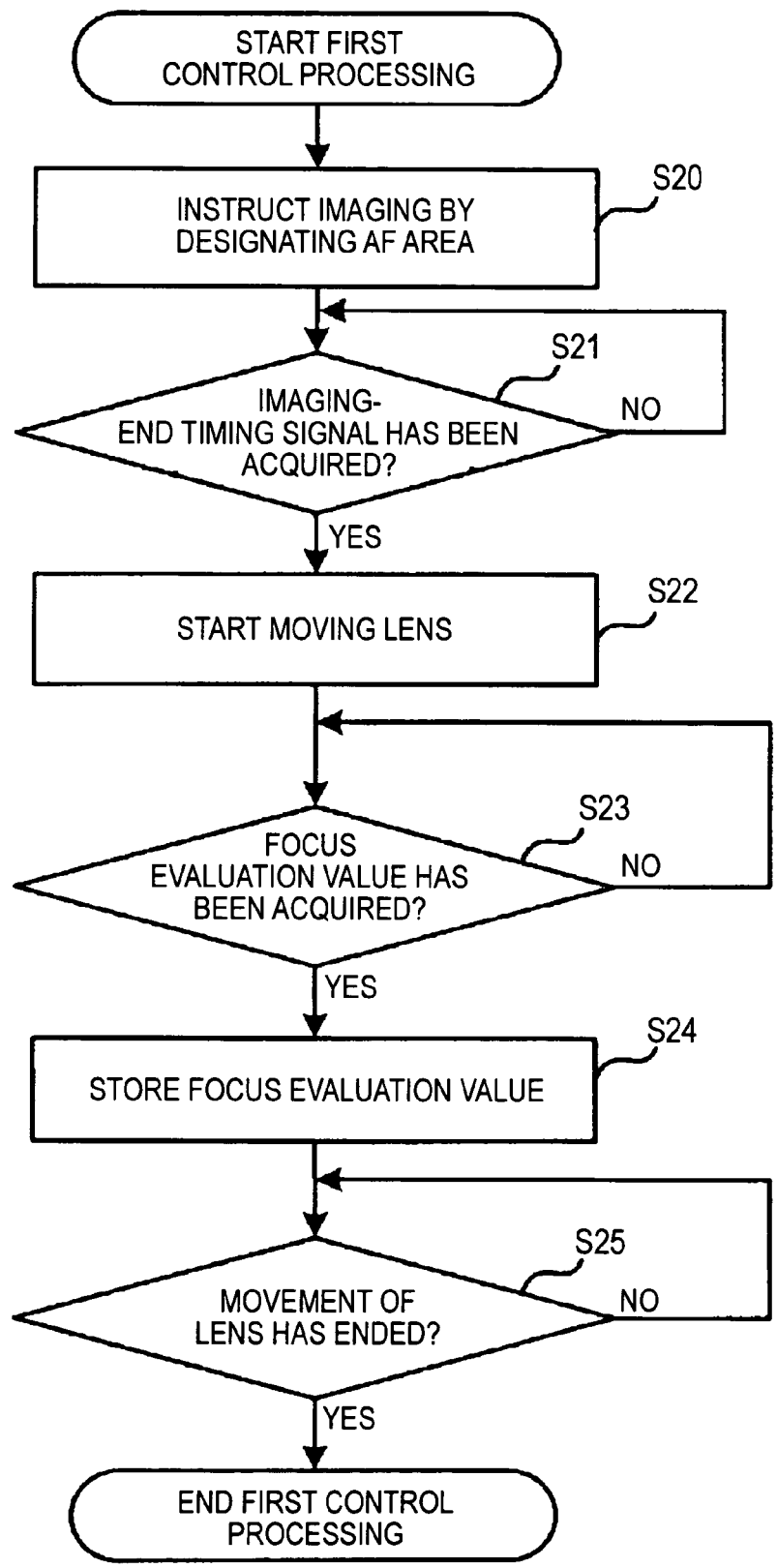
FIG. 5 is a chart showing the flow of first control processing shown in FIG. 4.
Figure 6:
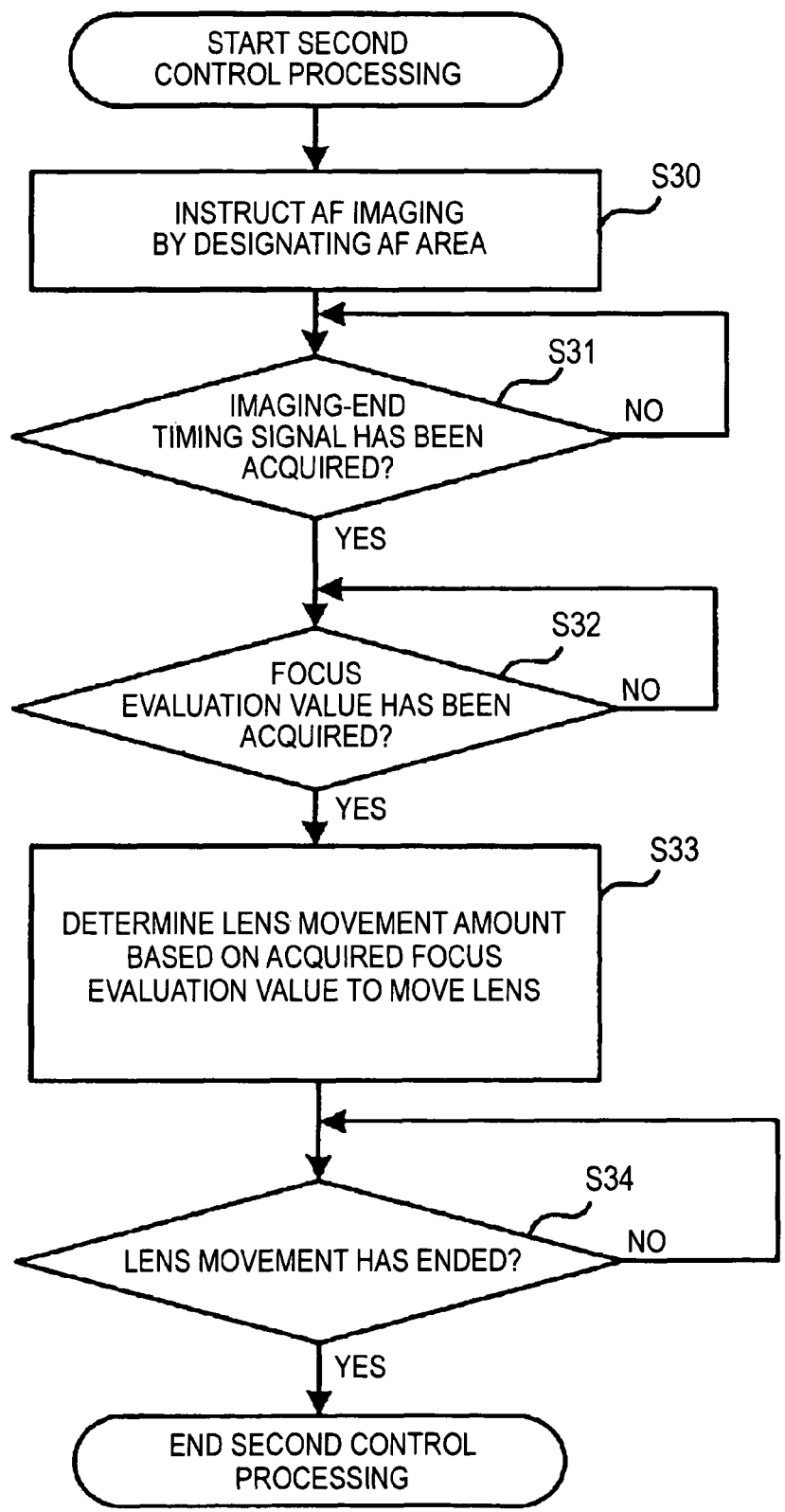
FIG. 6 is a view showing the flow of second control processing shown in FIG. 4.

The focus control processing of the imaging apparatus 1 of the embodiment is so-called hill climbing control in which the processing is repeated until the focus evaluation value reaches its peak. FIG. 2 is a view showing a timing chart of the focus control processing of the imaging apparatus 1, FIG. 3 is a graph for explaining determination of a peak value of the focus evaluation value, FIG. 4 is a chart showing the flow of imaging processing including the focus control processing performed by the control unit 20 of the imaging apparatus 1, FIG. 5 is a chart showing the flow of first control processing and FIG. 6 is a chart showing the flow of second control processing.

The imaging processing of the imaging apparatus 1 according to the embodiment is executed by performing the main imaging processing after the focus control processing is performed as shown in FIG. 2. When an imaging instruction designating a focus area is made by the control unit 20 to the solid-state imaging device 10 (refer to FIG. 2(a)), the imaging drive unit 17 of the solid-state imaging device 10 drives the imaging unit 11 to execute imaging of a subject (refer to FIG. 2(b).

The control unit 20, when performing the focus control processing, performs first control processing at first to acquire focus evaluation values from the solid-state imaging device 10, and when it determines that the focus evaluation value outputted from the solid-state imaging device 10 is close to the peak value, performs second control processing as shown in FIG. 2. Then, when the focus evaluation value reaches the peak, the main imaging is started.

In the first control processing, when the output of the analog image signals as an imaging result by the imaging unit 11 is completed, processings by the digital image signal processing unit 14, the edge detection unit 15 and the focus evaluation value generating unit 16 are executed (refer to FIG. 2 (c)) while processing of moving the focus adjustment lens 30 is started (refer to FIG. 2 (d)). That is, the movement of the focus adjustment lens 30 is started in parallel with the generation of the focus evaluation value without waiting the output of the focus evaluation value from the solid-state imaging device 10.

In the second control processing, when the output of the analog image signals as the imaging result by the imaging unit 11 is completed, the processing of moving the focus adjustment lens 30 is started after the processings by the digital image signal processing unit 14, the edge detection unit 15 and the focus evaluation value generating unit 16 are completed. That is, the output of the focus evaluation value from the solid-state imaging device 10 is waited, and a movement amount of the focus adjustment lens 30 is determined based on the focus evaluation value to start the movement of the focus adjustment lens 30.

Whether the focus evaluation value is close to the peak value or has reached the peak is determined by the control unit 20 based on the focus evaluation values acquired from the solid-state imaging device 10 and stored in an internal memory.

Specifically, the control unit 20 acquires focus evaluation values from the solid-state imaging device 10 by sequentially moving the focus adjustment lens 30, and determines that the focus evaluation value is close to the peak value when the acquired focus evaluation value is equal to or more than a predetermined value. Or, the control unit 20 estimates the peak value of the focus evaluation value from plural focus evaluation values acquired from the solid-state imaging device 10, and detects that the focus evaluation value has reached the peak by regarding the estimated value as the peak value.

For example, in an example shown in FIG. 3, whether the focus evaluation values are close to the peak value or not is determined based on a predetermined value α. The control unit 20 does not determine that the focus evaluation value is close to the peak value when the focus adjustment lens 30 is at a position of a timing "t1". On the other hand, the control unit 20 determines that the focus evaluation values are close to the peak value when the focus adjustment lens 30 is at positions of timings "t2" to "t4". The control unit 20 determines that the focus evaluation value is at the peak when the focus adjustment lens 30 is at a position of a timing "t5".

Therefore, the processing performed when the focus adjustment lens 30 is moved from the position of the timing "t1" to the position of the timing "t2" and the processing performed when the focus adjustment lens 30 is moved from the position of the timing "t2" to the timing "t3" are performed in the first control processing. The first control processing is performed also when the focus adjustment lens 30 is at the position of the timing "t2", which is because the movement of the focus adjustment lens 30 is started in parallel with the generation of the focus evaluation value in the first control processing.

On the other hand, the processing performed when the focus adjustment lens 30 is moved from the position of the timing "t3" to the positions of the timings "t4", "t5" sequentially is performed in the second control processing. In the first control processing, the movement of the focus adjustment lens 30 is started in parallel with the generation of the focus evaluation value, and therefore, time necessary for one focus control processing can be reduced as compared with the second control processing. On the other hand, when the focus evaluation value comes close to the peak value, the movement amount of the focus adjustment lens 30 is determined by using the focus evaluation value after the focus evaluation value is acquired by the second control processing. Therefore, it is possible to make the focus adjustment lens 30 reach quicker the position at which focus evaluation value is at the peak value.

When the control unit 20 acquires focus evaluation value from the solid-state imaging device 10 in process of moving the focus adjustment lens 30 in the first control processing, the unit may stop the movement of the focus adjustment lens 30 in accordance with the focus evaluation value. Accordingly, it is possible to set the movement amount of the focus adjustment lens 30 more properly.

Hereinafter, in the imaging processing including the above focus control processing, operations performed by the control unit 20 of the imaging apparatus 1 and operations performed by the solid-state imaging device 10 of the imaging apparatus 1 will be explained with reference to the drawings, respectively.

(Operations by the Control Unit 20)

First, operations performed by the control unit 20 of the imaging apparatus 1 in the imaging processing including the focus control processing will be explained.

When a power button (not shown) of the imaging apparatus is turned on, the control unit 20 waits for an autofocus instruction operation (hereinafter, referred to as an "AF imaging instruction") made by an operation to the operation unit 50 by a user. In the processing, the control unit 20 determines that the AF imaging instruction has been made when a shutter button (not shown) included in the operation unit 50 is pressed down, and starts the processing shown in FIG. 4.

As shown in FIG. 4, the control unit 20 outputs an imaging instruction signal for autofocus imaging to the solid-state imaging device 10 (Step S11) at first. Next, the control unit 20 determines whether edge position information with respect to the imaging instruction signal has been acquired from the solid-state imaging device 10 or not (Step S12).

When the edge position information is acquired from the solid-state imaging device 10 (Step S12: YES), the control unit 20 determines a focus area (hereinafter, referred to as an "AF area") used for autofocus control processing in the range in which the solid-state imaging device 10 can perform imaging (Step S13).

Next, the control unit 20 moves the focus adjustment lens 30 to start first control processing in which focus evaluation values are acquired from the solid-state imaging device 10 (Step S14). The first control processing is the processings of Step S20 to S25 shown in FIG. 5 which will be described later.

Next, the control 20 determines whether the focus evaluation value acquired from the solid-state imaging device 10 by the first control processing or later-described second control processing is the peak value or not (Step S15). For example, assume that subject images are taken sequentially as the focus adjustment lens 30 is moved from the position of the timing "t1" to the timing "t4" and focus evaluation values are outputted from the solid-state imaging device 10. At this time, the control unit 20 moves the focus adjustment lens 30 to a position assumed to be a focused position at the next timing "t5". The focus evaluation value outputted from the solid-state imaging device 10 at this time will be the peak value.

In the processing, when it is determined that the acquired focus evaluation value is not the peak value (Step S15: No), the control unit 20 determines whether the acquired focus evaluation value is close to the peak value or not (Step S16). Here, "the focus evaluation value is close to the peak value" means that the focus evaluation value is equal to or more than a predetermined value, and the predetermined value is stored in the memory of the control unit 20 in advance. For example, in the example shown in FIG. 3, the focus evaluation value is determined to be close to the peak value when the value is equal to or more than the predetermined value a.

When it is determined that the focus evaluation value is close to the peak value in the processing of Step S16 (Step S16: YES), the control unit 20 starts second control processing in which the focus adjustment lens 30 is moved after the focus evaluation value is acquired from the solid-state imaging device 10 (Step S17). The second control processing is the processings of Step S30 to S34 shown in FIG. 6 which will be described later.

On the other hand, when it is determined that the focus evaluation value is not close to the peak value in the processing of Step S16 (Step S16: NO), the control unit 20 moves the processing to Step S14. When the processing of Step 17 ends, the control unit 20 moves the processing to Step S15.

When it is determined that the acquired focus evaluation value is the peak value in the processing of Step S15 (Step S15: YES), the control unit 20 outputs an imaging instruction signal for the main imaging to the solid-state imaging device (Step S18). After that, the control unit 20 stores image data outputted from the solid-state imaging device in the storage unit 70 (Step S19), then, ends the processing.

Next, the first control processing shown in Step S14 will be explained with reference to FIG. 5.

As shown in FIG. 5, when the first control processing is started, the control unit 20 outputs the imaging instruction signal to the solid-state imaging device 10 by designating the AF area (Step S20). The control unit 20 waits for the output of the imaging-end timing signal from the solid-state imaging device 10 in response to the imaging instruction signal (Step S21).

In the processing, when receiving the imaging-end timing signal from the solid-state imaging device 10 (Step S21: YES), the control unit 20 determines a movement amount of the focus adjustment lens based on the focus evaluation value stored in the internal memory (step S22), and moves the focus adjustment lens 30 (Step S22).

After that, the control unit 20 waits for the output of the focus evaluation value from the solid-state imaging device 10 (Step S23). When receiving the focus evaluation value from the solid-state imaging device 10. (Step S23: YES), the control unit 20 stores the focus evaluation value in the internal memory (Step S24). After that, the control unit 20 determines whether the movement of the focus adjustment lens 30 has ended or not (Step S25), and when it is determined that the movement of the focus adjustment lens 30 has ended (Step S25: YES), the control unit ends the first control processing.

Next, the second control processing shown in Step S17 will be explained with reference to FIG. 6.

As shown in FIG. 6, when starting the second control processing, the control unit 20 outputs the imaging instruction signal to the solid-state imaging device 10 by designating the AF area (Step S30). The control unit 20 waits for the output of the imaging-end timing signal from the solid-state imaging device 10 in response to the imaging instruction signal (Step S31).

In the processing, when receiving the imaging-end timing signal from the solid-state imaging device 10 (Step S31: YES), the control unit 20 waits for the output of the focus evaluation value from the solid-state imaging device 10 (Step S32).

When receiving the focus evaluation value from the solid-state imaging device 10 (Step S32: YES), the control unit 20 stores the focus evaluation value in the internal memory. The control unit 20 further determines the movement amount of the focus adjustment lens 30 based on the focus evaluation values stored in the internal memory, and moves the focus adjustment lens 30 by controlling the lens moving mechanism 31 in accordance with the determined movement amount (Step S33). After that, the control unit 20 determines whether the movement of the focus adjustment 30 has ended or not (Step S34), and when it is determined that the movement of the focus adjustment 30 has ended (Step S34: YES) the control unit 20 ends the second control processing.

(Control by the Solid-State Imaging Device 10)

Figure 7:
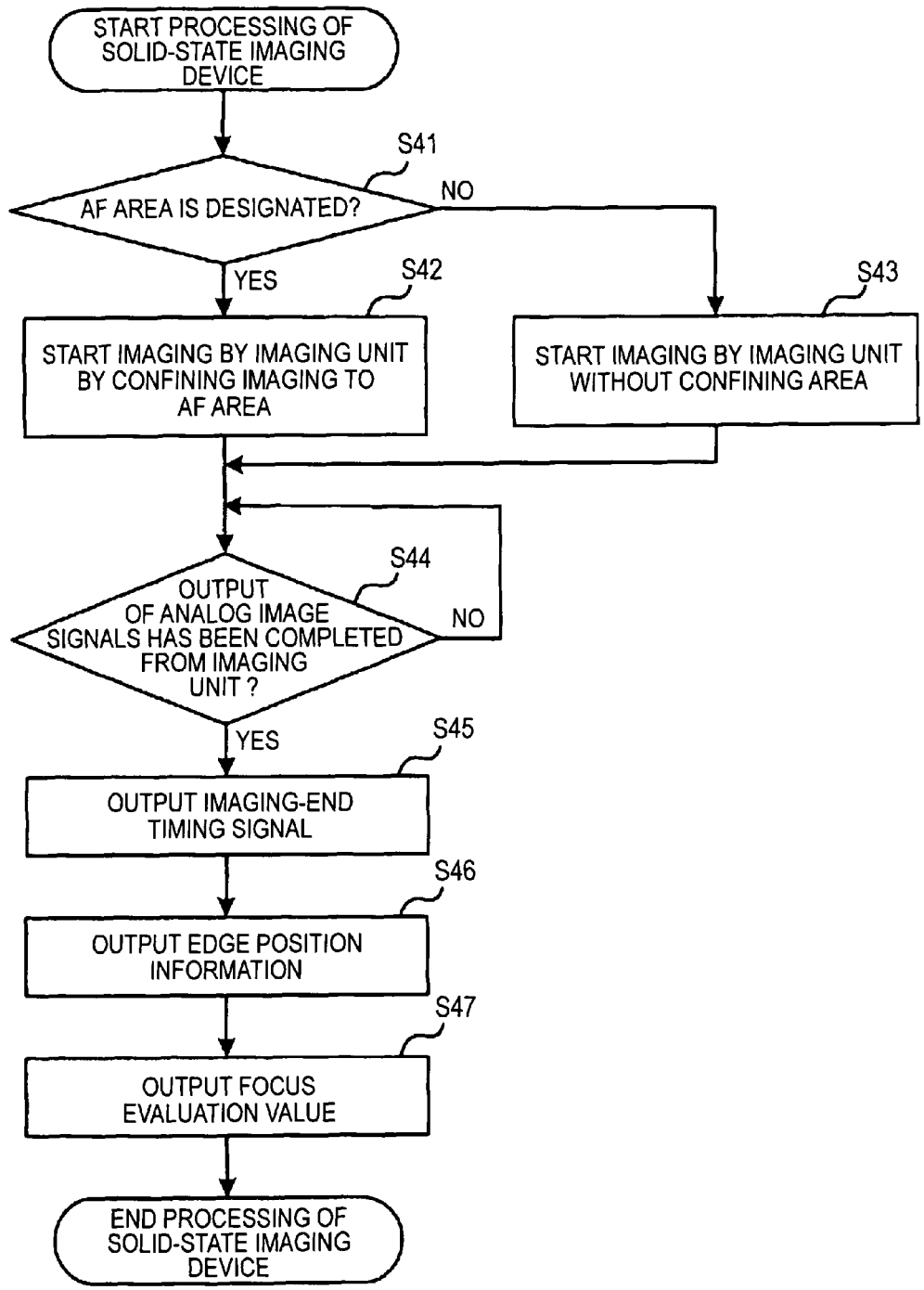
FIG. 7 is a chart showing the flow of imaging processing including the focus control processing performed by a solid-state imaging device of the imaging apparatus according to the first embodiment of the invention.

First, operations performed by the solid-state imaging device 10 of the imaging apparatus 1 in the imaging processing including the focus control processing will be explained. FIG. 7 is a chart showing the flow of the imaging processing including the focus control processing performed by the solid-state imaging device 10 of the imaging apparatus 1.

As shown in FIG. 7, when the imaging instruction signal is inputted from the control unit 20, the imaging drive unit 17 of the solid-state imaging device 10 determines whether there is a designation of an AF area or not (Step S41). In the processing, when it is determined that there is the designation of the AF area (Step S41: YES), the imaging drive unit 17 outputs a drive signal for AF control which confines the imaging range to the AF area to the imaging unit 11, and allows the imaging unit 11 to execute imaging of the AF area (Step S42). On the other hand, when it is determined that there is no designation of an AF area (Step S41: NO), the imaging drive unit 17 outputs a drive signal for normal imaging to the imaging unit 11 without confining the imaging area, and allows the imaging unit 11 to execute imaging without confining the area (Step S43).

Next, the imaging drive unit 17 waits for the completion of the output of analog image signals from the imaging unit 11 (Step S44), and outputs an imaging-end timing signal to the control unit 20 and the digital image signal processing unit 14 (Step S45) when the output of the analog image signals is completed (Step S44: YES). The digital image signal processing unit 14, when the imaging-end timing signal is inputted, performs various digital processings based on the digital image signals outputted through the analog image signal processing unit 12 and the A/D converting unit 13. For example, the digital image signal processing unit 14 generates and outputs digital image data of the subject image taken in the imaging unit 11 and luminance data thereof.

After that, the edge detection unit 15 to which the luminance data is inputted from the digital image signal processing unit 14 filters the luminance data by the band-pass filter, thereby extracting high frequency components (high luminance components) of the subject image taken in the imaging unit 11. After that, the edge detection unit 15 determines an edge portion of the image by calculating the high frequency components of the image taken by the solid-state imaging device 10 from the high luminance components, and outputs the result to the control unit 20 as edge position information (Step S46).

The focus evaluation value generating unit 16 integrates the high luminance components generated by the edge detection unit 15, and outputs the value to the control unit 20 as the focus evaluation value (Step S47) to end the imaging processing.

As described above, the imaging apparatus 1 according to the first embodiment includes the focus adjustment lens 30, the lens moving mechanism 31 which moves the focus adjustment lens 30 in an optical axis direction, the solid-state imaging device 10 and the control unit 20 which controls the lens moving mechanism 31 and the solid-state imaging device 10.

The solid-state imaging device 10 includes the imaging unit 11 which takes a subject image focused by the imaging optical system, the digital image signal processing unit 14 which generates image data of the subject image taken by the imaging unit 11 and luminance data thereof and the input/output unit 18 performing input/output of data. The solid-state imaging device 10 further includes the focus evaluation value generating unit 16 which generates the focus evaluation value of the subject image based on the luminance data outputted from the digital image signal processing unit 14 and outputs the focus evaluation value from the input/output unit 18, and the imaging drive unit 17. The imaging drive unit 17 allows the imaging operation by the imaging unit 11 when the imaging instruction signal is inputted from the input/output unit 18, and outputs the imaging-end timing signal to the input/output unit 18 when the imaging operation ends.

On the other hand, the control unit 20 outputs the imaging instruction signal to the input/output unit 18 of the solid-state imaging device 10 when detecting an autofocus instruction operation to the operation unit 50. Further, when the imaging-end timing signal is inputted from the input/output unit 18 of the solid-state imaging device 10, the control unit 20 controls the lens moving mechanism 31 to move the focus adjustment lens 30. Then, the control unit 20 determines the focused position of the focus adjustment lens 30 based on the focus evaluation value outputted from the input/output unit 18 of the solid-state imaging device 10.

As described above, the solid-state imaging device 10 according to the embodiment includes the DSP function, the edge detection function, the focus evaluation value generating function and the like which are necessary for executing the autofocus function inside the device. According to this, it is possible to make the imaging apparatus 1 compact by suppressing increase of wiring in the imaging apparatus 1 and complication of the configuration. Additionally, timings of imaging processing of autofocus, calculation processing of the focus evaluation value and lens movement control are optimized. Therefore, accuracy improvement of autofocus control processing, shortening of processing time and low power consumption can be realized.

The control unit 20 outputs the imaging instruction signal to the input/output unit 18 of the solid-state imaging device 10 when detecting the autofocus instruction operation to the operation unit 50. After that, when the imaging-end timing signal is inputted from the input/output unit 18 of the solid-state imaging device 10, the control unit 20 performs the processings of controlling the lens moving mechanism 31 to move the focus adjustment lens 30 as well as acquiring the focus evaluation value outputted from the input/output unit 18 of the solid-state imaging device 10. The control unit 20 repeats the above processing until the focus evaluation value outputted from the input/output unit 18 of the solid-state imaging device 10 reaches the peak.

Accordingly, the movement of the focus adjustment lens 30 and generation of the focus evaluation value are started at the same time, thereby reducing time necessary for one focus control processing.

The control unit 20 executes the control in the following manner when the focus evaluation value acquired from the solid-state imaging device 10 satisfies a given condition, for example, when the focus evaluation value is equal to or more than a predetermined value. That is, the control unit 20 acquires the focus evaluation value from the solid-state imaging device 10 without moving the focus adjustment lens 30 when the imaging-end timing signal is inputted from the input/output unit 18 of the solid-state imaging device 10. Then, the control unit 20 moves the focus adjustment lens 30 by the movement amount corresponding to the acquired focus evaluation value.

As described above, the movement amount of the focus adjustment lens 30 is determined by using the focus evaluation value after acquiring the focus evaluation value when the focus evaluation value is close to the peak value, thereby making the focus adjustment lens 30 quickly reach the positing at which focus evaluation value is at the peak.

Furthermore, the control unit 20 may stop the movement of the focus adjustment lens 30 in accordance with the focus evaluation value when the focus evaluation value is acquired from the solid-state imaging device 10 in process of moving the focus adjustment lens 30. Accordingly, it is possible to set the movement amount of the focus adjustment lens 30 more properly.

2. Second Embodiment

In the above first embodiment, the imaging apparatus 1 applying the hill climbing system as the autofocus control processing system has been explained. In the second embodiment, an imaging apparatus 1 applying a scan system will be explained. The imaging apparatus according to the second embodiment has the same configuration as the imaging apparatus 1 of the first embodiment, and includes the digital signal processing unit, the edge detection unit, the focus evaluation value generating unit and the like which are necessary for executing the autofocus function inside the solid-state imaging device. Since the second embodiment has the same configuration and differs from the first embodiment only in a processing method, the same reference numerals and signs as in the first embodiment are used for explanation.

Figure 8:
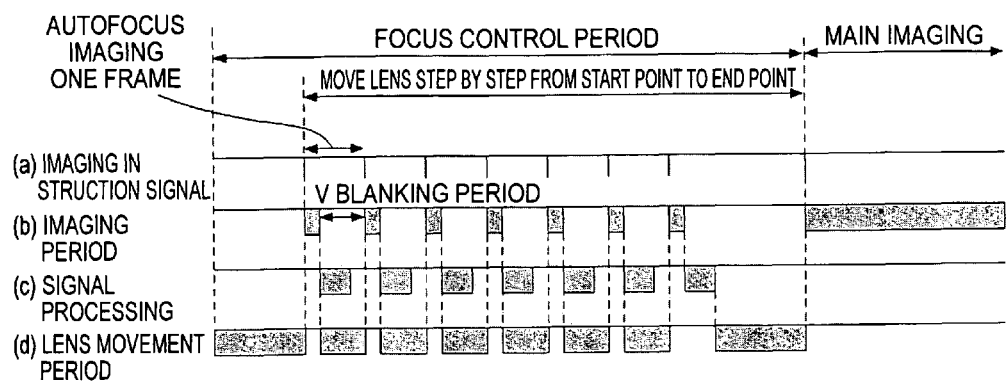
FIG. 8 is a view showing a timing chart of focus control processing of an imaging apparatus according to a second embodiment of the invention.
Figure 9:
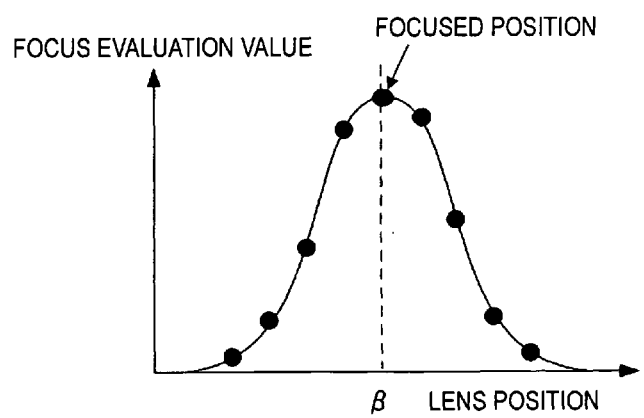
FIG. 9 is a graph for explaining determination of a peak value of a focus evaluation value according to the second embodiment of the invention.
Figure 10:
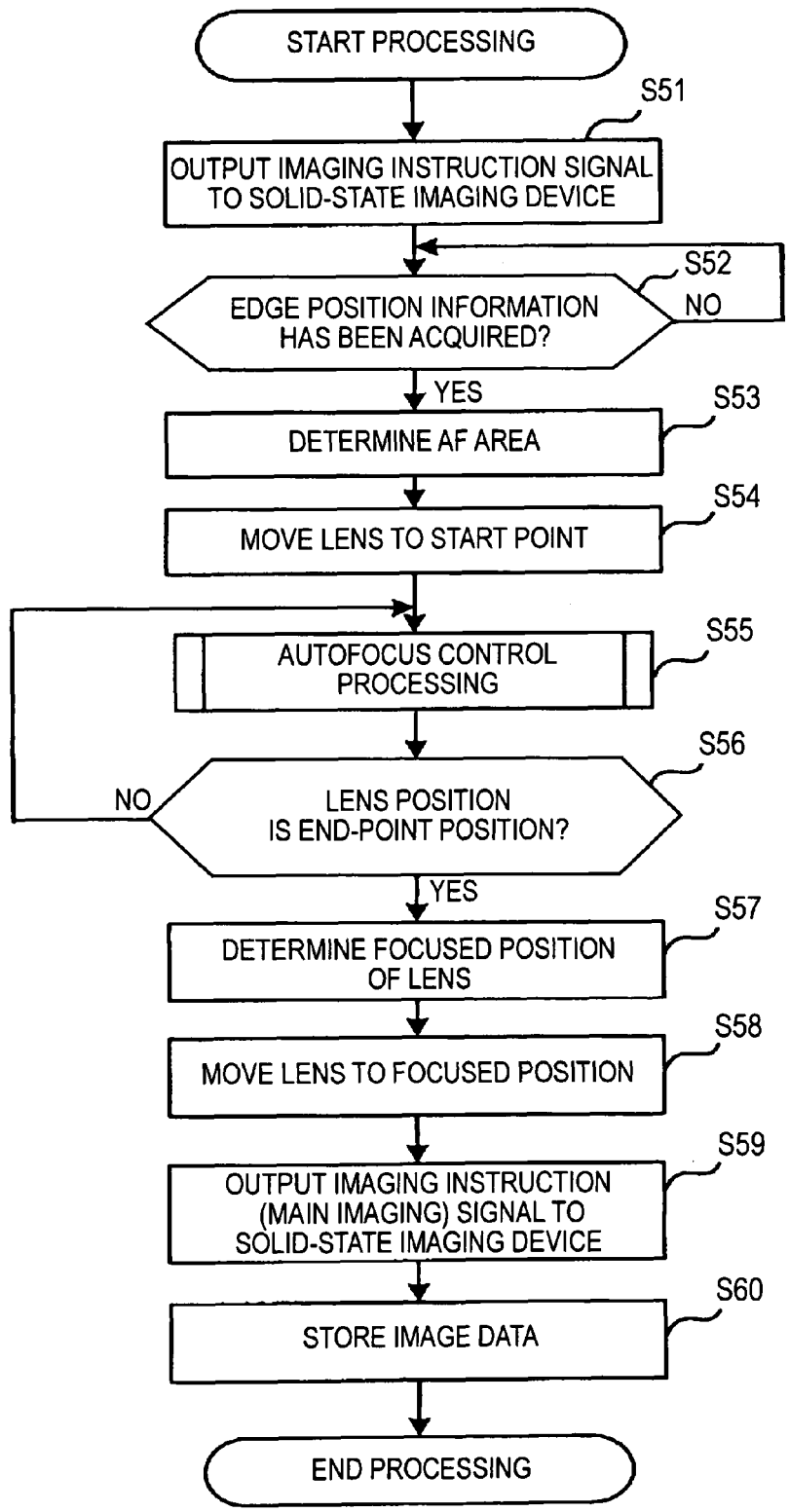
FIG. 10 is a chart showing the flow of imaging processing including the focus control processing performed by a control unit of the imaging apparatus according to the second embodiment of the invention.

The focus control processing of the imaging apparatus 1 of the present embodiment is the focus control processing of the scan system. In the scan system, the processing of acquiring the focus evaluation value outputted from the solid-state imaging device 10 by moving the focus adjustment lens 30 by a predetermined amount is performed over the whole movement range of the focus adjustment lens 30, and a position at which the focus evaluation value becomes maximum is determined as the focused position of the focus adjustment lens 30. FIG. 8 is a view showing a timing chart of the focus control processing of the imaging apparatus 1, FIG. 9 is a graph for explaining determination of the peak value of the focus evaluation value and FIG. 10 is a chart showing the flow of imaging processing including the focus control processing performed by the control unit 20 of the imaging apparatus 1.

The imaging processing of the imaging apparatus 1 of the second embodiment is executed by performing the main imaging processing after the focus control processing as shown in FIG. 8. When an imaging instruction signal for giving an imaging instruction designating a focus area to the solid-state imaging device 10 is outputted by the control unit 20 (refer to FIG. 8(*a*)), the imaging drive unit 17 of the solid-state imaging device 10 drives the imaging unit 11 to execute imaging of a subject (refer to FIG. 8(*b*)).

The imaging apparatus 1 of the second embodiment, when performing the focus control processing, starts movement of the focus adjustment lens 30 and the generation of the focus evaluation value at the same time when output of analog imaging signals as an imaging result by the imaging unit 11 is completed, as shown in FIG. 8.

That is, when the output of the analog image signals is completed, the processings by the digital image signal processing unit 14, the edge detection unit 15 and the focus evaluation value generating unit 16 are executed (refer to FIG. 8 (*c*)) and the moving processing of the focus adjustment lens 30 is started at the same time (refer to FIG. 8 (*d*)). Since the focus adjustment lens 30 is moved without waiting for the output of the focus evaluation value from the solid-state imaging device 10, a period per one frame of autofocus imaging can be shortened and an autofocus period can be shortened.

The control unit 20 determines a position of the focus adjustment lens 30 at which the focus evaluation value outputted from the solid-state imaging device 10 becomes maximum by moving the focus adjustment lens 30 by a given amount, and then, determines the position as a focused position of the focus adjustment lens 30. After that, the focus adjustment lens 30 is moved to the focused position and the main imaging processing by the solid-state imaging device 10 is performed.

For example, in the example shown in FIG. 9, a position β of the focus adjustment lens 30 where the maximum focus evaluation value among the stored focus evaluation values is acquired is determined as the focused position of the focus adjustment lens 30.

Hereinafter, operations performed by the control unit 20 of the imaging apparatus 1 with respect to the imaging processing including the above focus control processing will be explained with reference to the drawings. Note that the operations performed by the solid-state imaging device 10 of the imaging apparatus 1 are the same as the first embodiment.

When a power button (not shown) of the imaging apparatus 1 is turned on, the control unit 20 waits for an AF imaging instruction made by an operation to the operation unit 50 by a user. In the processing, the control unit 20 determines that the AF imaging instruction has been made when a shutter button (not shown) included in the operation unit 50 is pressed down, and starts processing shown in FIG. 10.

As shown in FIG. 10, the control unit 20 outputs an imaging instruction signal to the solid-state imaging device 10 (Step S51) at first. Next, the control unit 20 determines whether edge position information with respect to the imaging instruction signal has been acquired from the solid-state imaging device 10 or not (Step S52).

When the edge position information is acquired from the solid-state imaging device 10 (Step S52: YES), the control unit 20 determines a focus area (hereinafter, referred to as an "AF area") used for autofocus control processing in the range in which the solid-state imaging device 10 can perform imaging (Step S53).

Next, the control unit 20 moves the focus adjustment lens 30 to a start-point position (Step S54), performing autofocus control processing (Step S55). The autofocus is the same processing as the first control processing in the Step S14 of the first embodiment (processing shown in FIG. 5), however, the processing differs from the first embodiment in that the lens is moved by a predetermined amount in the processing of Step S22 shown in FIG. 5.

When the autofocus control processing of Step S55 is completed, the control unit 20 determines whether the position of the focus adjustment lens 30 is an end-point position or not (Step S56). In other words, whether the focus evaluation values have been acquired over the whole movement range of the focus adjustment lens 30 or not is determined.

When it is determined that the focus adjustment lens 30 is at the end-point position (Step S56: YES), the control unit 20 determines the focused position of the focus adjustment lens 30 based on the focus evaluation values acquired from the solid-state imaging device 10 in the processing of Step S55 (Step S57). The control unit 20 determines that the position of the focus adjustment lens 30 where the maximum focus evaluation value among the focus evaluation values stored in the internal memory is acquired is the focused position of the focus adjustment lens 30.

Next, the control unit 20 controls the lens moving mechanism 31 to move the focus adjustment lens 30 to the determined focused position (Step S58) as well as controls the solid-state imaging device 10 to output an imaging instruction signal for the main imaging to the solid-state imaging device 10 (Step S59). After that, the control unit 20 stores image data outputted from the solid-state imaging device in the storage unit 70 (Step S60) to end the processing.

As described above, in the imaging apparatus 1 according to the second embodiment, timings of imaging processing of autofocus, calculation processing of the focus evaluation value and lens movement control are optimized. Therefore, accuracy improvement of autofocus control processing, shortening of processing time and low power consumption can be realized.

Particularly, the control unit 20 outputs the imaging instruction signal to the input/output unit 18 of the solid-state imaging device 10 when the autofocus instruction operation to the operation unit is detected. After that, when the imaging-end timing signal is inputted from the input/output unit 18 of the solid-state imaging device 10, the control unit 20 controls the lens moving mechanism 31 to move the focus adjustment lens 30 by a predetermined amount and acquires the focus evaluation value outputted from the input/output unit of the solid-state imaging device 10. The series of processings is performed over the whole movement range of the focus adjustment lens 30, and the position at which the focus evaluation value outputted from the input/output unit 18 of the solid-state imaging device 10 becomes maximum in respective moved positions of the focus adjustment lens 30 is determined as the focused position of the focus adjustment lens 30.

As described above, the movement of the focus adjustment lens 30 and the generation of the focus evaluation value is started at the same time, thereby reducing time necessary for one focus control processing.

3. Other Embodiments

In the above embodiments, since the imaging in the solid-state imaging device 10 is started by outputting the imaging instruction signal to the solid-state imaging device 10 by the control unit 20, the period of one frame of the autofocus imaging is variable, however, one frame of the autofocus imaging may be fixed. In this case, a synchronization signal is outputted from the imaging drive unit 17 of the solid-state imaging device 10 to the control unit 20 at a timing when the imaging is started. The control unit stops moving the focus adjustment lens 30 when the synchronization signal is inputted from the imaging drive unit 17 at a timing during movement of the focus adjustment lens 30.

Also in the above embodiments, the edge position information indicating the edge portion of the image is generated from the high luminance components of image signals, and the focus area (image area used for calculation of the focus evaluation value) is allowed to follow the movement of the edge portion, however, the invention is not limited to this. For example, it is also possible that the focus area is confined only to the central position of the image for reducing time for the autofocus processing.

The present application contains subject matter related to that disclosed in Japanese Priority Patent Application JP 2008-312667 filed in the Japan Patent Office on Dec. 8, 2008, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:
an input/output unit configured to perform input/output of signals between a solid-state imaging device and a control unit, wherein
the solid-state imaging device includes
an imaging unit that takes a subject image focused by an imaging optical system, the imaging optical system including a focus adjustment lens positioned in an optical axis direction by a lens moving mechanism,
a digital signal processing unit that generates image data based on luminance data of the subject image taken by the imaging unit,
a focus evaluation value generating unit that generates a focus evaluation value of the subject image based on the luminance data outputted from the digital signal processing unit and outputs the focus evaluation value to the control unit through the input/output unit, and an imaging drive unit that starts an imaging operation by the imaging unit when an imaging instruction signal is received from the control unit through the input/output unit, and outputs an imaging-end timing signal to the control unit through the input/output unit when the imaging operation is completed; and the control unit controls the solid-state imaging device through the input/output unit in accordance with operation to an operation unit and controls the lens moving mechanism, wherein the control unit outputs the imaging instruction signal to the input/output unit of the solid-state imaging device when detecting an autofocus instruction operation to the operation unit, controls the lens moving mechanism to move the focus adjustment lens when the imaging-end timing signal is inputted from the input/output unit of the solid-state imaging device and determines a focused position of the focus adjustment lens based on the focus evaluation value outputted from the input/output unit of the solid-state imaging device, and wherein the imaging drive unit outputs the imaging-end timing signal directly to the control unit through the input/output unit.

2. The imaging apparatus according to claim 1,
wherein, when the imaging-end timing signal is inputted from the input/output unit of the solid-state imaging device, the control unit repeats processes of controlling the lens moving mechanism to move the focus adjustment lens while acquiring the focus evaluation value outputted from the input/output unit of the solid-state imaging device until the focus evaluation value outputted from the input/output unit of the solid-state imaging device reaches the peak.

3. The imaging apparatus according to claim 2,
wherein, in the case that the focus evaluation value acquired from the solid-state imaging device satisfies a given condition, the control unit acquires the focus evaluation value from the solid-state imaging device without moving the focus adjustment lens when the imaging-end timing signal is inputted from the input/output unit of the solid-state imaging device and moves the focus adjustment lens by a movement amount corresponding to the acquired focus evaluation value.

4. The imaging apparatus according to claim 3,
wherein the control unit stops movement of the focus adjustment lens in accordance with the focus evaluation value when the focus evaluation value is acquired from the solid-state imaging device in a process of moving the focus adjustment lens.

5. The imaging apparatus according to claim 2,
wherein the control unit stops movement of the focus adjustment lens in accordance with the focus evaluation value when the focus evaluation value is acquired from the solid-state imaging device in a process of moving the focus adjustment lens.

6. The imaging apparatus according to claim 1,
wherein the control unit outputs the imaging instruction signal to the input/output unit of the solid-state imaging device when detecting the autofocus instruction operation to the operation unit, performs the processes of controlling the lens moving mechanism to move the focus adjustment lens by a predetermined amount as well as acquiring the focus evaluation value outputted from the input/output unit of the solid-state imaging device in a movement range of the focus adjustment lens when the imaging-end timing signal is inputted from the input/output unit of the solid-state imaging device and determines a position at which the focus evaluation value outputted from the solid-state imaging device becomes maximum in respective moved positions of the focus adjustment lens as the focused position of the focus adjustment lens.

7. The imaging apparatus according to claim 1,
wherein, in a subsequent control processing, when the focus evaluation value acquired during the first control processing is determined to be within a predetermined range of the peak, a subsequent movement amount of the focus adjustment lens is determined by using a focus evaluation value generated during the subsequent control processing.

8. The imaging apparatus according to claim 1, wherein the input/output unit includes an interface and an input/output terminal.

9. The imaging apparatus according to claim 1, wherein the solid-state imaging device further includes
an edge detection unit that determines edge portion data of the subject image based on the luminance data outputted from the digital signal processing unit and outputs the edge portion data of the subject image to the control unit through the input/output unit.

10. The imaging apparatus according to claim 1, wherein the focus evaluation value generating unit generates the focus evaluation value of the subject image by integrating high luminance components generated by the edge detection unit.

11. The imaging apparatus according to claim 1,
wherein the imaging drive unit outputs the imaging-end timing signal directly to the digital image signal processing unit.

* * * * *